G. R. MAYCOCK & G. E. AVERETT.
SELF CLEANING FISH SCREEN.
APPLICATION FILED JAN. 6, 1909.
916,570. Patented Mar. 30, 1909.
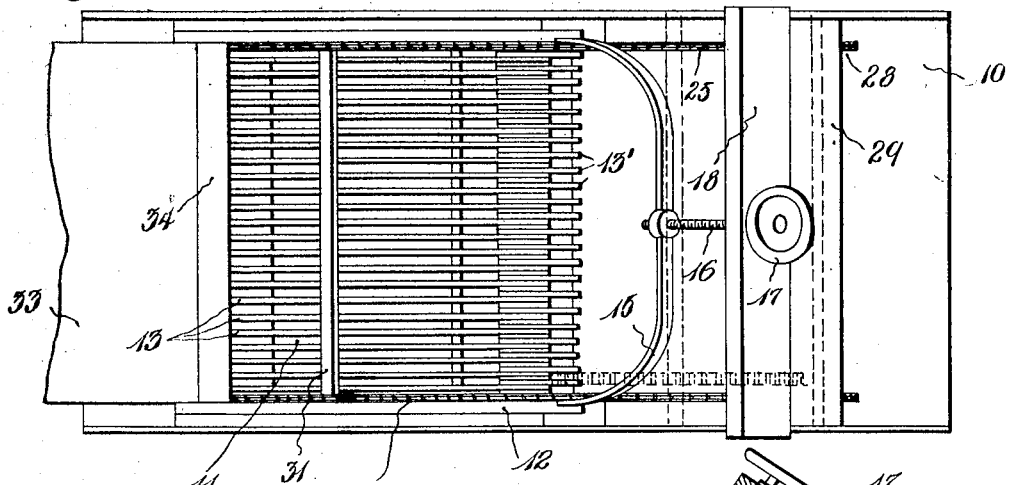
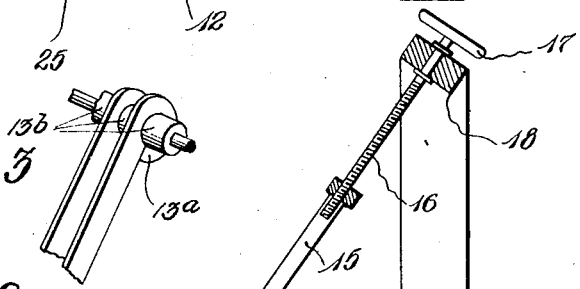
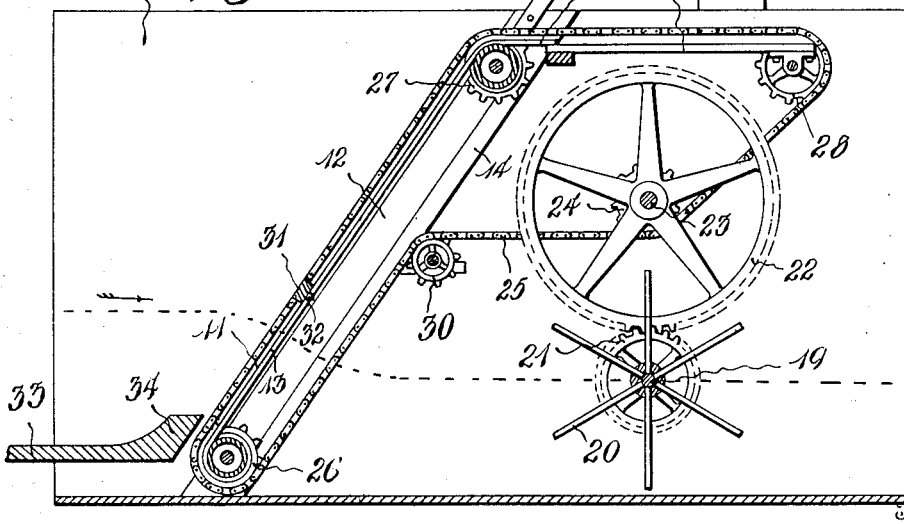

UNITED STATES PATENT OFFICE.

GEORGE R. MAYCOCK AND GEORGE E. AVERETT, OF SPRINGVILLE, UTAH.

SELF-CLEANING FISH-SCREEN.

No. 916,570.

Specification of Letters Patent.

Patented March 30, 1909.

Application filed January 6, 1909. Serial No. 470,959.

*To all whom it may concern:*

Be it known that we, GEORGE R. MAYCOCK and GEORGE E. AVERETT, citizens of the United States, residing at Springville, in the county of Utah and State of Utah, have invented certain new and useful Improvements in Self-Cleaning Fish-Screens, of which the following is a specification.

This invention relates to devices for use in irrigation and power canals, and also in any other water ways, for the purpose of screening the same to protect the fish. Under the laws of some of the Commonwealths it is required that such canals be provided with screens to prevent the passage of fish during certain seasons of the year. It being known that fish screens are likely to collect floating leaves, or other rubbish, such as would tend to clog or dam up the same, it is essential that means be provided for automatically keeping the screens clear of such rubbish, so as to provide an unobstructed passage for the water therethrough.

For a full understanding of the invention, including its construction and characteristic advantages, reference is to be had to the following detail description and the accompanying drawings, in which—

Figure 1 is a plan view of the invention; Fig. 2 is a vertical longitudinal sectional view thereof, certain parts being shown in elevation, and Fig. 3 is a detail of a modification of the means for connecting the bars, to be hereinafter described.

Throughout the several figures similar parts are referred to by like reference characters.

At 10 is indicated in a conventional manner a fragment of a flume or power canal which conveys water in the direction indicated by the arrow. A screen 11, consisting of a suitable frame 12 and a series of bars 13 is mounted for sliding movement in guide ways 14 connected in any suitable manner to the walls of the canal. At the upper end of the frame 12 is connected any suitable form of yoke 15 having operative connection, as by a screw-threaded bar 16 with a hand wheel 17, journaled for rotation in a cross head 18 supported above the canal. By this hand-operated means the screen may either be elevated entirely clear of the water in the canal as may be desirable in certain seasons of the year, or else it may be adjusted slightly to provide proper tension on the driving mechanism hereinbelow set forth.

Journaled in any suitable manner below the screen and near the bottom of the canal is a shaft 19 which carries a water wheel 20. The lower portion of the water wheel dips into and is driven by the current of water flowing through the canal. Connected to said shaft 19 is a pinion 21 which meshes with a gear 22 mounted on a counter shaft 23. Said shaft 23 is provided with sprocket wheels 24, which serve to drive suitable sprocket chains 25, which extend around the frame 12 and screen 11, passing over idler sprockets 26, 27, and 28. The sprockets 26 are journaled at or near the lower end of the frame and the sprockets 27 at the upper end of the frame. The sprocket wheels 28 are journaled in bearings carried by a supplemental frame 29, which is mounted substantially stationary with respect to the canal walls and which extends sufficiently far down stream to project beyond the water wheel 20 and the gearing. An idler sprocket or sprockets 30 may be located between the water wheel and the screen at any suitable place for the purpose of maintaining proper driving connection between the chains 25 and the sprockets 24, and whereby in connection with the adjustability of the screen will insure proper tension on the chains. The sprockets 30 will preferably be journaled in stationary bearings carried by the canal walls.

A rake 31 having teeth or prongs 32 is mounted transversely of the screen and connected to the chains 25, whereby the rake is adapted to drag up along the screen for the purpose of drawing any rubbish which would tend to clog the same up over the upper end of the screen and out beyond the overhang 29. Any suitable number of such rakes may be connected to the chains, ordinarily, however, one being sufficient. If desired the upper ends 13' of the screen bars may be directed horizontally so as to lie above the over-hang 29, thus insuring that the rubbish will be drawn from the screen over upon and beyond the over-hang aforesaid.

In order to prevent the passage of fish beneath the screen when not desired for them to do so, we provide in the bottom of the flume or canal above the screen a false bottom or frame 33 having a projection 34 directed upwardly close to the upper surface of the screen and between which and the screen bars the rake 31 will pass. This guard 34 will permit a considerable degree of adjustment of the screen and frame in order to secure the necessary tension on the chains 25, without endangering the loss of fish beneath the screen. As an alternative form for the bars 13, they may be curved at their upper ends as indicated at 13ª, and spaced apart by spacing sleeves 13ᵇ, whereby by changing the said sleeves so as to vary their length the bars 13 may be spaced apart at greater or less distances, depending upon the desire in any particular case.

Having thus set forth the best embodiment of the invention now known to us, but not desiring to be limited to the specific construction illustrated except as will be necessary by the state of the prior art, what we claim as new, and desire to secure by Letters Patent of the United States, is:

1. In a self-cleaning fish screen, the combination of a frame, screen bars connected thereto, wheels journaled at the upper and lower ends of said frame, flexible power elements operating over said wheels, a rake connected to said flexible elements and operating over said screen bars longitudinally thereof, a transverse shaft mounted below the screen, a water wheel mounted on said shaft, a counter-shaft above the power shaft, gearing connecting the water wheel and the counter-shaft and having driving connection with the aforesaid flexible elements, said flexible elements passing entirely around the screen bars and frame and around said counter-shaft.

2. In a self-cleaning fish screen, the combination of a screen proper comprising a frame and screen bars connected thereto, means for adjusting the screen longitudinally, a stationary platform on the down stream side of the screen, sprocket wheels journaled in said platform and in said frame, power means below the screen and platform, sprocket chains passing around said sprocket wheels and driven from said power means, and a rake connected to said chains and operatively thereby upwardly over and around said screen and platform.

3. In a self-cleaning fish screen, the combination of a frame, screen bars connected thereto, power means below the frame, a rake operative over and around said frame and bars, driving connections between the power means and said rake, a guard above the lower end of the frame, and means to adjust the frame longitudinally along said guard, for the purpose set forth.

4. In a self-cleaning fish screen, the combination of a frame, screen bars connected thereto, power means below the frame, a rake operative over and around said frame and bars, driving connections between the power means and said rake, a stationary platform on the down stream side of the upper end of the frame, said bars at their upper ends extending above said platform, and means to adjust the frame relatively to said platform.

In testimony whereof we affix our signatures in presence of two witnesses.

GEORGE R. MAYCOCK.
GEORGE E. AVERETT.

Witnesses:
JOHN R. BROMLEY,
GEO. W. CLARKE.